United States Patent Office 2,940,981
Patented June 14, 1960

2,940,981

METHOD FOR ISOLATING AND CRYSTALLIZING CHLOROPHYLL

Hans J. Trurnit, Baltimore, Leonard Peter Zill, Timonium, and Germille Colmano, Baltimore, Md., assignors to The Martin Company, Middle River, Md., a corporation of Maryland No Drawing. Filed July 14, 1958, Ser. No. 748,125

4 Claims. (Cl. 260—314)

This invention relates to an improved method of separating chlorophyll from impure organic extracts of green plant pigments which is especially adapted to the isolation and crystallization of pure chlorophyll $a$ and chlorophyll $b$.

The first evidence that pure chlorophyll can be obtained in crystalline form was reported by Jacobs et al. in Archives of Biochemistry and Biophysics, 53,288 (1954). Prior to this investigation it was believed that solid chlorophyll occurs only in the amorphous form, and is, as a rule, unstable when dried. However, chlorophyll precipitated from methanol-petroleum ether solution from which the methanol was washed with water was observed to be relatively stable. Upon investigating this discrepancy, Jacobs et al. determined that two conditions were necessary for precipitating crystalline chlorophyll from organic extracts of green plant pigments, specifically, high purity of the phase from which chlorophyll is to be precipitated and the presence of water during crystallization.

The condition on purity of the chlorophyll-carrying phase dictated that many time-consuming purification steps involving the use of large amounts of reagents be performed. As a consequence, chlorophyll has been obtained in relatively poor yields.

A purpose of this invention is to provide a method of separating semi-crystalline chlorophyll consisting of chlorophyll $a$ crystals together with amorphous chlorophyll $b$ from organic extracts of green plant pigments which is faster, simpler and less expensive than previous methods, and which gives a higher yield of chlorophylls. Further the isolation of crystalline chlorophyll $a$ from amorphous chlorophyll $b$ is greatly facilitated by means of this method. It is estimated that the improved process described hereinafter will reduce the cost per gram of pure chlorophyll from its present value of about $8,500 to approximately $1,000, and correspondingly increase its availability for commercial and research utilization.

Contrary to prior practice, no purification of the chlorophyll-carrying phase is performed. This novel procedure is based upon the discovery that micro-crystalline chlorophyll appears very early in the standard separation procedure while other compounds remain dissolved. By taking advantage of this fact the separation of pure chlorophyll from solutions of mixed pigments is appreciably simplified. A better appreciation of this improvement will be derived from a reading of the above reference, a portion of which is outlined below:

Pigment extraction and preliminary purification:
  (1) Extract fresh green plant tissue with acetone and discard brei.
  (2) Transfer pigments from resulting solution to petroleum ether (Skelly Solvent F) by treatment with distilled water.
  (3) Wash petroleum ether layer with aqueous methanol solution to remove carotenols.
  (4) Filter out precipitated carotenols.

Chlorophyll separation and final purification:
  (5) Separate chlorophyll from filtrate by washing with additional water.
  (6) Adsorb chlorophyll pigment on diatomaceous earth.
  (7) Wash chlorophyll with petroleum ether to remove remaining carotenoids.
  (8) Dissolve washed adsorbate in acetone.
  (9) Transfer pigment to ethyl ether.
  (10) Remove acetone from resulting solution by exhaustive washing with water.

Chlorophyll collection:
  (11) Evaporate ether solution under vacuum to precipitate chlorophyll.

The product obtained in step (11) by evaporation of the water-saturated ether solution contains coprecipitated chlorophyll $a$ and chlorophyll $b$. Isolation of the $a$ and $b$ forms may be effected chromatographically on a powdered sugar column as described by Jacobs et al., but isolation of the individual chlorophylls is not a part of the present invention.

During a systematic spectrophotometric survey of each fraction obtained during the preparation of chlorophylls according to the method of Jacobs et al. a sample of the petroleum ether extract of the pigments, step 2, showed a pronounced absorption band with a peak of 745 mu. This absorption band is associated with a micro-crystalline suspension of chlorophyll $a$ (see J. Chem Physics 22, 142 (1954), Jacobs and Holt). Chlorophyll $b$, however, coprecipitates in the amorphous form. As described below, the suspension of chlorophylls can be separated directly from other pigments which remain dissolved in the petroleum ether, thus eliminating the multi-step purification procedure heretofore required for producing pure chlorophylls.

In accordance with the present invention an organic extract of pigments is obtained from fresh green plant tissue, and the pigments transferred to petroleum ether by the addition of water. A suspension of chlorophyll microcrystals forms in the petroleum ether, substances such as carotene, xanthophyll, sterols and other lipoidal materials remaining dissolved in the same phase. The suspension may be centrifuged to separate a mixture of pure chlorophylls which is washed free of the mother liquor with petroleum ether. Spectroscopic and X-ray diffraction examinations of these precipitates show the presence of crystalline chlorophyll $a$ and amorphous chlorophyll $b$.

It is well known that water-soluble, petroleum ether-insoluble solvents other than acetone may be used to extract chlorophylls from green plant tissue, for example, methyl alcohol or ethyl alcohol. Acetone, however, has been found to be the most suitable material for this operation.

The term petroleum ether as used herein refers generically to pure or mixed liquid saturated hydrocarbons. Although the inexpensive Skelly Solvent F, a mixture of saturated hydrocarbons, is preferred, it will be appreciated that substances such a pentane, hexane, heptane, octane, their isomers, and mixtures of the aforeasid substances are also applicable.

This procedure, then, constitutes a four-step method for preparing pure chlorophylls in contrast to the eleven-step method previously outlined. The steps comprise (1) acetone extraction of pigments from fresh green plant tissue, (2) water transfer of the pigments to petroleum ether to form a suspension of chlorophylls, (3) separation and (4) washing of the chlorophylls.

The following is an illustrative example of the present method:

Four pounds of fresh spinach are blended with acetone to extract the pigments. This mixture is suction-filtered through a pad of Hyflo Super Cel (a filter aid) on Whatman #1 filter paper utilizing a Buchner funnel. The first fraction containing part of the yellow pigment and acetone soluble liquids is discarded. After further acetone extraction of the gross content of the chlorophylls, the pigments are transferred in a separatory funnel to a single 500 ml. portion of petroleum ether (Skelly Solvent F) by successive treatment of one liter portions of the acetone extract with 2.5 liter portions of distilled water. A suspension of chlorophyll $a$ crystals and amorphous chlorophyll $b$ is formed. The suspension in petroleum ether is centrifuged to bring down the chlorophylls, which are washed several times with fresh petroleum ether to remove impurities such as carotenols. Semi-crystalline chlorophyll so obtained may then be refrigerated for further use or separated into chlorophyll $a$ and chlorophyll $b$ by the method of Jacobs et al.

Powder diagrams of the mixture of chlorophylls $a$ and $b$ precipitated from petroleum ether are identical with powder diagrams of pure chlorophyll $a$ crystals. A similar observation has been made with synthetic mixtures of chlorophyll $a$ and $b$ (see Jacobs et al., J. Chem. Physics, 21, 2246–1953). The spectrum of the redissolved precipitate shows the presence of chlorophyll $b$, indicating that chlorophyll $b$ in an amorphous form coprecipitates with the microcrystalline chlorophyll $a$.

To prevent undue oxidation of the chlorophylls all operations should be performed at relatively low temperatures, preferably 4° C., although other suitable temperatures will be readily apparent to persons skilled in the art.

From the above description it will be understood that this method is not limited to a particular starting material, such as spinach, but applies to other green plant tissue. Moreover, instead of using acetone for the initial pigment extraction, other solvents may be made to serve the same purpose. These and other variations are well known in the art, and are incidental to the present invention, whose important feature is the direct precipitation of crystalline chlorophyll $a$ and amorphous chlorophyll $b$ from impure petroleum ether extracts of green plant pigments.

We claim:

1. In the method of obtaining pure chlorophyll from fresh green plant tissue comprising the steps of extracting the pigments from green plant tissue with acetone, transferring said pigments to petroleum ether with water, thereby forming a suspended precipitate of chlorophyll in said ether, mechanically separating said chlorophyll precipitate from said ether, and purifying the chlorophyll so separated, the aforesaid steps being performed at a temperature sufficiently low to prevent oxidation of the chlorophyll, the improvement comprising the step of purifying said chlorophyll by washing same with fresh portions of petroleum ether so as to remove petroleum ether-soluble materials from said chlorophyll whereby a mass of pure chlorophyll is obtained.

2. The method of claim 1 wherein said chlorophyll in said ether is mechanically separated therefrom by filtration.

3. The method of claim 1 wherein said chlorophyll in said ether is mechanically separated therefrom by centrifugation.

4. The method of purifying chlorophyll which has been transferred from an acetonal extract of fresh green plant tissue into a petroleum ether phase with water, and mechanically separated from said ether phase, said method comprising the step of washing the chlorophyll mechanically separated from the petroleum ether phase with fresh portions of petroleum ether so as to remove petroleum ether-soluble materials from said chlorophyll, whereby a mass of pure chlorophyll is obtained, said method being performed at a temperature sufficiently low to prevent oxidation of the chlorophyll.

References Cited in the file of this patent

UNITED STATES PATENTS

| | | |
|---|---|---|
| 2,098,110 | Schertz et al. | Nov. 2, 1937 |
| 2,131,394 | Test | Sept. 27, 1938 |

FOREIGN PATENTS

| | | |
|---|---|---|
| 730,473 | Germany | Jan. 12, 1943 |

OTHER REFERENCES

Jennison et al.: Jour. Tenn. Acad. Sci., vol. 9, pp. 274–275 (1934).

Rothemund: Medical Physics, Glasser editor, The Year Book Publisher, Chicago, Ill. (1944).